US012332803B2

(12) United States Patent
Confalonieri et al.

(10) Patent No.: US 12,332,803 B2
(45) Date of Patent: Jun. 17, 2025

(54) MEMORY CONTROLLER ARCHITECTURE (71) Applicant: Micron Technology, Inc., Boise, ID (US)

(72) Inventors: Emanuele Confalonieri, Segrate (IT); Stephen S. Pawlowski, Beaverton, OR (US); Patrick Estep, Rowlett, TX (US)

(73) Assignee: Micron Technology, Inc., Boise, ID (US)

( * ) Notice: Subject to any disclaimer, the term of this patent is extended or adjusted under 35 U.S.C. 154(b) by 88 days.

(21) Appl. No.: 18/202,802

(22) Filed: May 26, 2023

(65) Prior Publication Data

US 2024/0004799 A1 Jan. 4, 2024

Related U.S. Application Data (60) Provisional application No. 63/357,562, filed on Jun. 30, 2022.

(51) Int. Cl.
*G06F 11/00* (2006.01)
*G06F 11/10* (2006.01)
*G06F 12/0897* (2016.01)

(52) U.S. Cl.
CPC ...... *G06F 12/0897* (2013.01); *G06F 11/1064* (2013.01); *G06F 2212/1032* (2013.01)

(58) Field of Classification Search
CPC . G06F 12/0897; G06F 11/1064; G06F 11/073
See application file for complete search history.

(56) References Cited

U.S. PATENT DOCUMENTS

| | | | |
|---|---|---|---|
| 11,868,282 B1* | 1/2024 | Sonksen | G06F 12/0831 |
| 2021/0182187 A1* | 6/2021 | Raghava | G06F 12/126 |
| 2022/0137864 A1 | 5/2022 | Lee | |
| 2022/0147476 A1 | 5/2022 | Nam et al. | |
| 2022/0156146 A1 | 5/2022 | Choe et al. | |
| 2022/0188033 A1* | 6/2022 | Cho | G06F 3/0679 |
| 2022/0207193 A1* | 6/2022 | Caraccio | G11C 11/2275 |
| 2023/0050808 A1* | 2/2023 | Li | G06F 13/1668 |
| 2023/0187413 A1* | 6/2023 | Yoshihara | G11C 16/26 257/777 |
| 2023/0236933 A1* | 7/2023 | Thirumala | G06F 11/1004 714/6.24 |
| 2023/0280930 A1* | 9/2023 | Song | G06F 3/0604 |
| 2024/0004799 A1* | 1/2024 | Confalonieri | G06F 11/1064 |

* cited by examiner

*Primary Examiner* — Philip Guyton
(74) *Attorney, Agent, or Firm* — Brooks, Cameron & Huebsch, PLLC (57) ABSTRACT

An apparatus can include a plurality of memory devices and a memory controller coupled to the plurality of memory devices via a plurality of memory channels. The plurality of memory channels are organized as a plurality of channel groups. The memory controller comprises a plurality of memory access request/response buffer sets, and each memory access request/response buffer set of the plurality of memory access request/response buffer sets corresponds to a different one of the plurality of channel groups.

16 Claims, 6 Drawing Sheets

MEMORY CONTROLLER ARCHITECTURE

PRIORITY INFORMATION

This application claims the benefit of U.S. Provisional Application No. 63/357,562, filed on Jun. 30, 2022, the contents of which are incorporated herein by reference.

TECHNICAL FIELD

The present disclosure relates generally to semiconductor memory and methods, and more particularly, to apparatuses, systems, and methods for a memory controller architecture.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Systems, apparatuses, and methods related to a memory controller architecture are described. The memory controller can be within a memory system, which can be a memory module, a storage device, or a hybrid of a memory module and a storage device. In various embodiments, the memory controller can include a memory access/request buffer architecture that can reduce access latency as compared to prior approaches. The memory controller can be coupled to a plurality of memory devices via a plurality of memory channels which can be organized as a plurality of channel groups. The memory controller can comprise a plurality of memory access request/response buffer sets with each memory access request/response buffer set of the plurality corresponding to a different one of the plurality of channel groups. In various embodiments, the memory controller is configured to operate the plurality of channel groups as independent respective reliability, availability, and serviceability (RAS) channels. As described further herein, each channel group (e.g., RAS channel) may (or may not) include an associated independent cache used in association with accessing the memory devices to which the memory controller is coupled.

In various previous approaches, a memory controller of a memory system includes a memory access request/response buffer (e.g., read and/or write queue) in a portion of the memory controller that interfaces with a host (e.g., a front end portion). The memory access requests are then moved through the memory controller for execution at a backend portion that interfaces with the media (e.g., memory devices). As the memory system approaches a "loaded" condition in which various queues become more full, the front end queues can become congested, which can lead to the front end memory access queues serving as a bottleneck of the memory controller and/or memory system, adversely affecting (e.g., increasing) latency. As an example, the latency caused by front end memory access queue congestion significantly increases as the transfer rate from the host to the memory system increases.

Various embodiments of the present disclosure provide a controller architecture that can provide benefits such as improved (e.g., reduced) latency associated with memory accesses as compared to prior approaches. A number of embodiments include a memory controller having a plurality of memory access request/response buffer sets that can be operated independently to service separate non-overlapping physical address ranges. Request/response buffer architectures described herein can be effectively and efficiently operated over multiple host interface speeds and transfer rates.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. It is to be understood that data can be transmitted, received, or exchanged by electronic signals (e.g., current, voltage, etc.) and that the phrase "signal indicative of [data]" represents the data itself being transmitted, received, or exchanged in a physical medium.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 310 in FIG. 3. Analogous elements within a Figure may be referenced with a hyphen and extra numeral or letter. See, for example, elements 130-1, 130-2, 130-N in FIG. 1. Such analogous elements may be generally referenced without the hyphen and extra numeral or letter. For example, elements 130-1, 130-2, 130-N may be collectively referenced as 130. As used herein, the designators "M" and "N" and "X", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
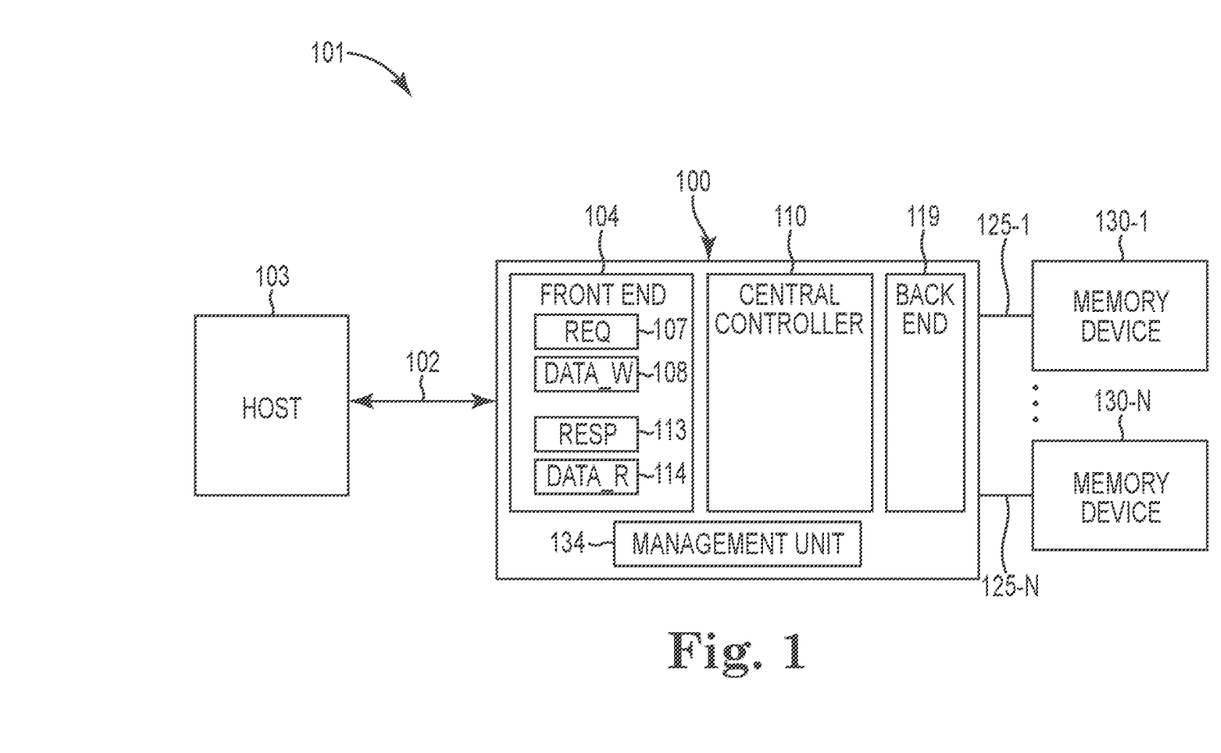
FIG. 1 is a block diagram of a computing system including a memory controller in accordance with a number of embodiments of the present disclosure.

FIG. 1 is a block diagram of a computing system 101 including a memory controller 100 in accordance with a number of embodiments of the present disclosure. The memory controller 100 includes a front end portion 104, a central controller portion 110, and a back end portion 119. The computing system 101 includes a host 103 and memory devices 130-1, . . . ,130-N coupled to the memory controller 100. The computing system 101 can be, for example, a high performance computing (HPC) data center among various other types of computing systems (e.g., servers, desktop computers, laptop computers, mobile devices, etc.).

Although not shown in FIG. 1, the front end portion 104 can include a physical layer (PHY) and a front end controller for interfacing with the host 103 over a bus 102, which can include a number of input/output (I/O) lanes. The bus 102 can include various combinations of data, address, and control busses, which can be separate busses or one or more combined busses. In at least one embodiment, the interface between the memory controller 100 and the host 103 can be a peripheral component interconnect express (PCIe) physical and electrical interface operated according to a compute express link (CXL) protocol. As non-limiting examples, the bus 102 can be a PCIe 5.0 interface operated in accordance with a CXL 2.0 specification or a PCIe 6.0 interface operated in accordance with a CXL 3.0 specification.

CXL is a high-speed central processing unit (CPU)-to-device and CPU-to-memory interconnect designed to accelerate next-generation data center performance. CXL technology maintains memory coherency between the CPU memory space and memory on attached devices such as accelerators, memory buffers, and smart I/O devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface. CXL provides protocols with I/O semantics similar to PCIe (e.g., CXL.io), caching protocol semantics (e.g., CXL.cache), and memory access semantics (CXL.mem). CXL can support different CXL device types (e.g., Type 1, Type 2, and Type 3) supporting the various CXL protocols. Embodiments of the present disclosure are not limited to a particular CXL device type.

In the example shown in FIG. 1, the front end 104 includes a number of memory access request buffers 107 (REQ) and 108 (DATA_W) and a number of memory access response buffers 113 (RESP) and 114 (DATA_R). As an example, the request buffer 107 can be a read request buffer for queuing host read requests received from the host 103 to be executed by the controller 100 (e.g., by memory channel controllers of the back end 119) to read data from the memory devices 130. The request buffer 108 can be a write request buffer for queuing write requests and corresponding data received from the host to be executed by controller 100 to write data to the memory devices 130. The response buffer 113 can be a write response buffer for queuing write responses to be provided from the controller 100 to the host 103. The response buffer 114 can be a read response buffer for queuing read responses and corresponding data to be provided from the controller 100 to the host 103. The buffers can be implemented as first-in-first-out (FIFO) buffers; although, embodiments are not limited to a particular buffer type. In a number of embodiments, the buffers 107 and 108 can be referred to as master to subordinate (M2S) buffers since they involve transactions from the host 103 (e.g., master) to the memory controller 100 (e.g., subordinate), and the buffers 113 and 114 can be referred to as subordinate to master (S2M) buffers since they involve transactions from the controller 100 to the host 103.

The central controller 110 can be responsible for controlling various operations associated with executing memory access requests (e.g., read commands and write commands) from the host 103. For example, although not shown in FIG. 1, the central controller 110 can include a cache and various error circuitry (e.g., error detection and/or error correction circuitry) capable of generating error detection and/or error correction data for providing data reliability among other RAS functionality in association with writing data to and/or reading data from the memory devices 130. As described further herein, such error detection and/or correction circuitry can include cyclic redundancy check (CRC) circuitry, error correcting code (ECC) circuitry, redundant array of independent disks (RAID) circuitry, and/or "chip kill" circuitry, for example. Also, as described further below, the cache can be implemented as a plurality of independent caches (e.g., a separate cache per channel group).

The back end portion 119 can include a number of memory channel controllers (e.g., media controllers) and a physical (PHY) layer that couples the memory controller 100 to the memory devices 130. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In various embodiments, the physical data transmission medium includes memory channels 125-1, . . . , 125-N. The memory channels 125 can be, for example, 16-bit channels each coupled to 16-bit (e.g., x16) devices, to two 8-bit (x8) devices; although embodiments are not limited to a particular back end interface. As another example, the channels 125 can each also include a two pin data mask inversion (DMI) bus, among other possible bus configurations. The back end portion 119 can exchange data (e.g., user data and error detection and/or correction data) with the memory devices 130 via the physical pins corresponding to the respective memory channels 125. As described further herein, in a number of embodiments, the memory channels 125 can be organized as a number of channel groups, with the memory channels of each group being accessed together in association with executing various memory access operations and/or error detection and/or correction operations.

The memory devices 130 can be, for example, dynamic random access memory (DRAM) devices operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). However, embodiments are not limited to a particular type of memory device 130. For example, the memory devices 130 can be FeRAM devices.

In some embodiments, the memory controller 100 can include a management unit 134 to initialize, configure, and/or monitor characteristics of the memory controller 100. The management unit 134 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

In various instances, the memory access request/response buffers 107, 108, 113, and 114 can become congested, which can lead to increased latency associated with host read and/or write access requests. As described further below in association with FIGS. 4A, 4B, and 5, various embodiments of the present disclosure can include implementing multiple sets of memory access request/response buffers, which can reduce or alleviate the latency associated with the buffers 107, 108, 113, and 114. The multiple sets can correspond to respective channel groups, for instance.

Figure 2:
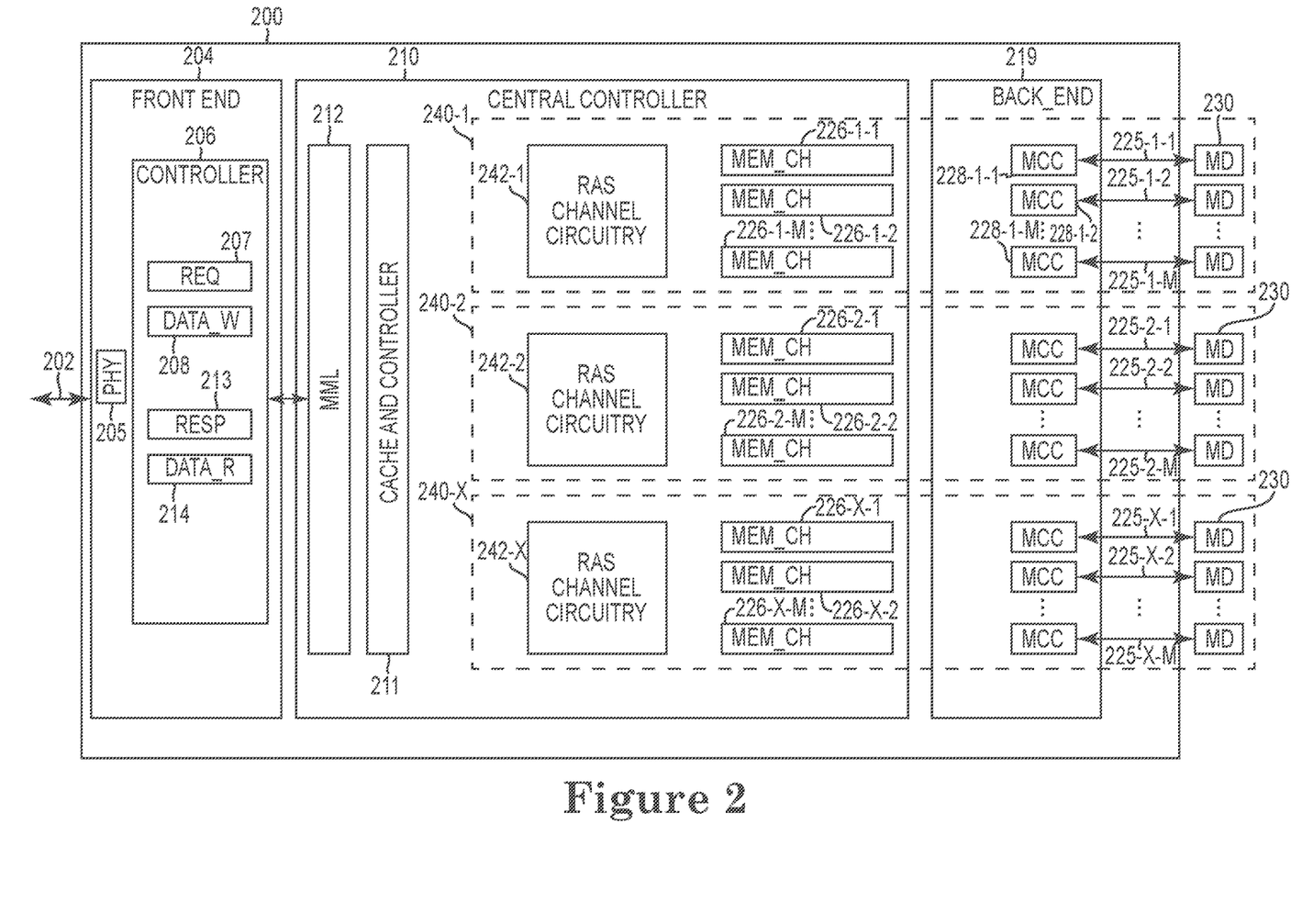
FIG. 2 is a block diagram of a memory controller coupled to a plurality of memory devices.

FIG. 2 is a block diagram of a memory controller 200 coupled to a plurality of memory devices 230. As shown in FIG. 2, the controller 200 includes a front end portion 204, a central portion 210, and a back end portion 219. The controller 200 can be a controller such as controller 100 described in FIG. 1.

The front end portion 204 includes a front end PHY 205 for interfacing with a host via communication link 202, which can be a CXL link, for example. The front end 204 includes a front end controller 206 to manage the interface and communicate with the central controller 210. In embodiments in which the link 202 is a CXL link, the front end controller 206 is configured to receive (e.g., from a host) memory access requests, according to a CXL protocol, directed at the memory devices 230, and to provide (e.g., to a host) memory access responses, according to a CXL protocol, corresponding to memory access requests.

The front end controller 206 can include memory access request/response buffers 207, 208, 213, and 214, which can be analogous to the respective buffers 107, 108, 113, and 114 described in FIG. 1.

The controller 200 is coupled to the memory devices 230 via a number of memory channels 225. In this example, the memory channels 225 are organized as a number of channel groups 240-1, 240-2, . . . , 240-X. In this example, each channel group 240 comprises "M" memory channels 225. For instance, channel group 240-1 comprises memory channels 225-1-1, 225-1-2, . . . , 225-1-M, channel group 240-2 comprises memory channels 225-2-1, 225-2-2, . . . , 225-2-M, and channel group 240-X comprises memory channels 225-X-1, 225-X-2, . . . , 225-X-M. Although each channel group is shown as comprising a same quantity of memory channels 225, embodiments are not so limited.

In this example, the back end portion 219 of controller 200 includes a plurality of memory channel controllers (MCC) 228 for interfacing with memory devices 230 corresponding to the respective memory channels 225. As shown in FIG. 2, the memory channel controllers 228-1-1, 228-1-2, . . . , 228-1-M corresponding to channel group 240-1 are coupled to the memory devices 230 via respective channels 225-1-1, 225-2-2, . . . , 225-1-M. In another example, the memory channel controllers 228-1, 228-2, . . . , 228-M can be implemented as a single memory channel controller driving "M" memory channels. Although not shown in FIG. 2, the back end 219 includes a PHY memory interface for coupling to the memory devices 230.

The respective channels 225 of the channel groups 240-1, 240-2, . . . , 240-X are operated together for purposes of one or more RAS schemes. Accordingly, the channel groups 240 may be referred to as "RAS channels." In this example, the channel groups 240-1, 240-2, . . . , 240-X include respective error circuitry (RAS CHANNEL CIRCUITRY) 242-1, 242-2, . . . , 242-X. The error circuitry 242 can include various circuitry for error detection and/or error correction, which can include data recovery. The error circuitry 242 can also include CRC circuitry, ECC, circuitry, RAID circuitry and/or chip kill circuitry, including various combinations thereof. The channel groups 240-1, 240-2, . . . , 240-X can be operated independently by the central controller 210 such that memory access requests and/or error operations can be separately (and concurrently) performed on the memory devices 230 corresponding to the respective channel groups 240.

The term "chip kill" generally refers to a form of error correction that protects memory systems (e.g., the memory system 101 shown in FIG. 1) from any single memory device 230 (chip) failure as well as multi-bit error from any portion of a single memory chip. Chip kill circuitry can correct errors in the data with a desired chip kill protection collectively across subsets of the memory devices 230 (e.g., subsets corresponding to respective channel groups 240).

An example chip kill implementation for channel groups 240 comprising eleven memory channels 225 (e.g., "M"=11) corresponding to a bus width of 176 bits (16 bits/channel×11 channels) can include writing data to memory devices 230 of eight of the eleven memory channels 225 and parity data to memory devices 230 of three of the eleven memory channels 225. Four codewords can be written, each composed of eleven four-bit symbols, with each symbol belonging to a different channel/device. A first codeword can comprise the first four-bit symbol of each memory device 230, a second codeword can comprise the second four-bit symbol of each memory device 230, a third codeword can comprise the third four-bit symbol of each memory device 230, and a fourth codeword can comprise the fourth four-bit symbol of each memory device 230.

The three parity symbols can allow the chip kill circuitry (e.g., 242) to correct up to one symbol error in each codeword and to detect up to two symbol errors. If instead of adding three parity symbols, only two parity symbols are added, the chip kill circuitry can correct up to one symbol error but only detect one symbol error. In various embodiments, the data symbols and the parity symbols can be written or read concurrently from memory devices of the eleven channels (e.g., 225-1-1 to 225-1-11). If every bit symbol in a die fails, only the bit symbols from that memory device 230 in the codeword will fail. This allows memory contents to be reconstructed despite the complete failure of one memory device 2230. The aforementioned chip kill operation is considered to be "on-the-fly correction" because the data is corrected without impacting performance by performing a repair operation. Embodiments are not limited to the particular example chip kill operation described above. In contrast to chip kill operations that may not involve a repair operation, various RAID approaches are considered to be "check-and-recover correction" because a repair process is initiated to recover data subject to an error. For example, if an error in a symbol of a RAID stripe is determined to be uncorrectable, then the corresponding data can be recovered/reconstructed by reading the remaining user data of the stripe and XORing with the stripe's corresponding parity data.

As shown in FIG. 2, each of the channel groups 240 can include memory channel datapath circuitry (MEM CH) 226 associated with the corresponding memory channels 225 of a particular channel group 240. For example, channel group 240-1 includes memory channel datapath circuitry 226-1-1, 226-1-2, . . . , 226-1-M corresponding to respective channels 225-1-1, 225-1-2, . . . , 225-1-M. Similarly, channel group 240-2 includes memory channel datapath circuitry 226-2-1, 226-2-2, . . . , 226-2-M corresponding to respective channels 225-2-1, 225-2-2, . . . , 225-2-M, and channel group 240-X includes memory channel datapath circuitry 226-X-1, 226-X-2, 226-X-M corresponding to respective channels 225-X-1, 225-X-2, . . . , 225-X-M. The datapath circuitry 226 can include error circuitry corresponding to error detection or error correction on a particular memory channel 225. For instance, the datapath circuitry 226 might include CRC circuitry or ECC circuitry. That is, in contrast to the error circuitry 242, which can be associated with multiple channels 225 within the channel group 240, the error circuitry of datapath circuitry 226 can be associated with or dedicated to a particular memory channel 225.

As shown in FIG. 2, the central controller 210 can include a media management layer (MML) 212 that can be used to translate memory access requests in accordance with a particular protocol (e.g., CXL compliant requests) into a protocol compliant with the particular central controller architecture and/or particular type of memory media (e.g., memory devices 230). Unlike the controller 100 shown in FIG. 1, which did not illustrate a cache in the central controller 110, the central controller 210 includes a cache 211 and an associated cache controller. The cache 211 can be used, for example, to temporarily store data frequently accessed (e.g., by a host).

The cache 211 can add latency to memory operations depending on various factors such as transaction load, hit rate, etc. For instance, the cache 211 might operate efficiently at a particular rate of transfer (e.g., 32GT/s) from the host; however, the cache 211 can become a bottleneck if the transfer rate from host increases (e.g., to 64GT/s) such that a clock speed corresponding to the cache 211 is not able to keep up with the increased transfer rate. As another example, memory access request queues (not shown) in the front end 204 of controller 200 and/or cache lookup request queues (not shown) in the central controller 210 may become full or overloaded if the transfer rate between the front end 204 and the host (e.g., the host transfer rate) increases with respect to the transfer rate between the front end 204 and the central controller 210.

As described further below, various embodiments of the present disclosure can provide a cache architecture that can reduce the adverse effects (e.g., on latency) that can be caused by an increased host transfer rate, for example. For instance, as shown in FIGS. 3, 4A, and 4B, various embodiments can include providing multiple separate caches (e.g., per channel group) that can be independently operated (e.g., by a central controller) in order to service more memory access requests per unit time than a single cache (e.g., multiple cache lookup operations can be performed in parallel on the caches of the respective channel groups).

Figure 3:
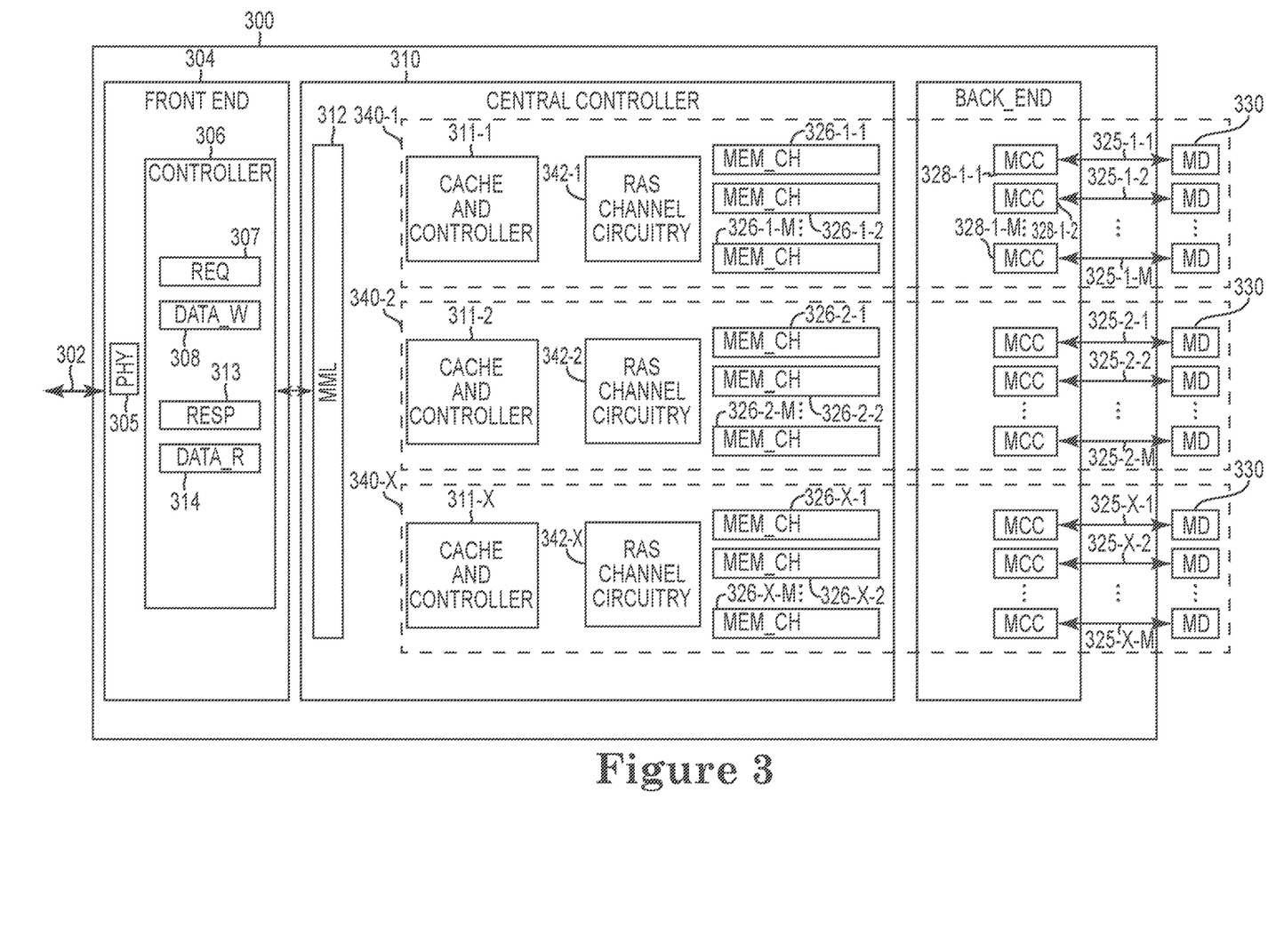
FIG. 3 is a block diagram of a memory controller having a cache architecture operable in accordance with a number of embodiments of the present disclosure.
Figure 4A:
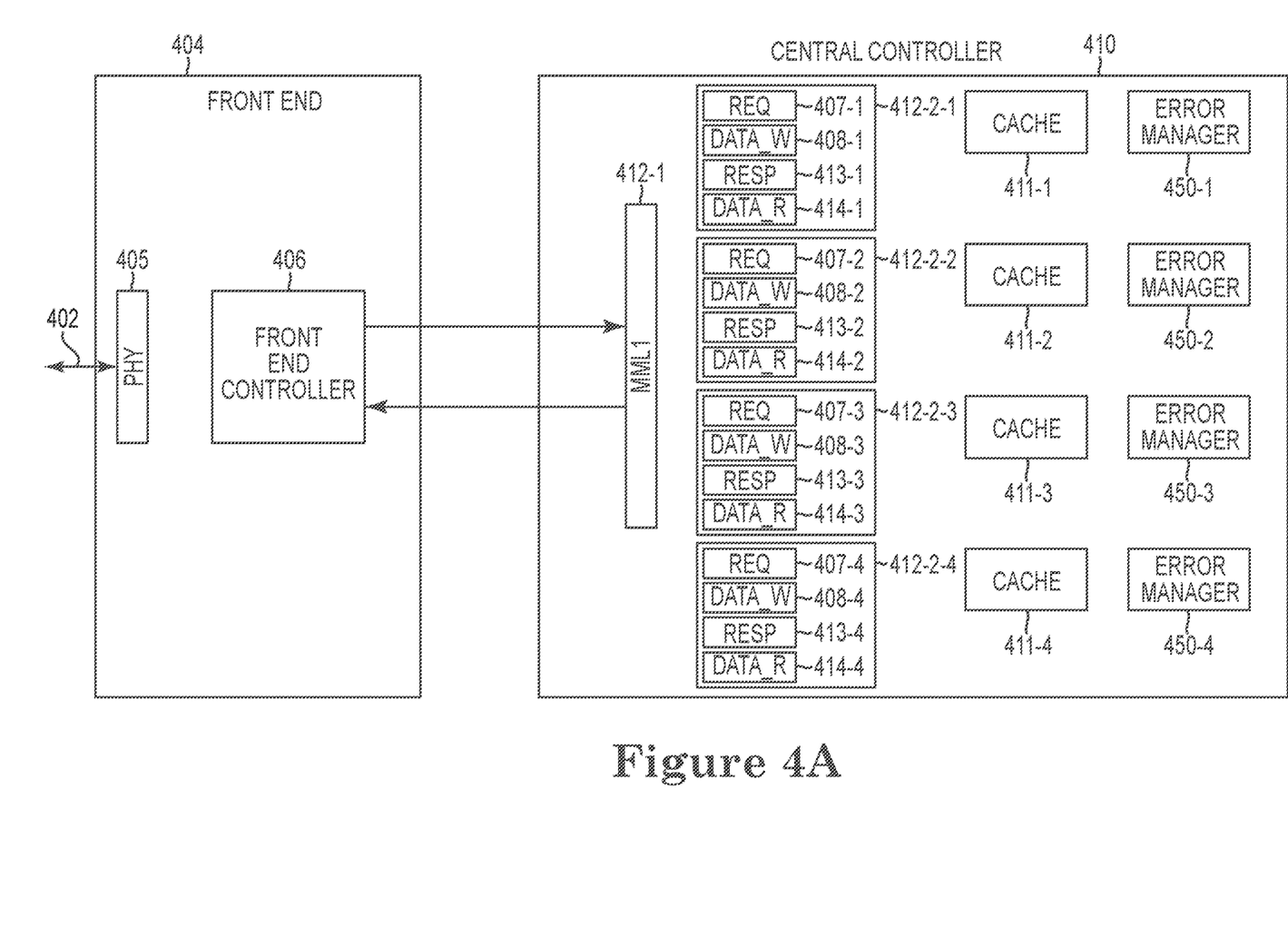
FIG. 4A is a block diagram of a portion of a memory controller having a memory access request/response buffer architecture in accordance with a number of embodiments of the present disclosure.
Figure 4B:
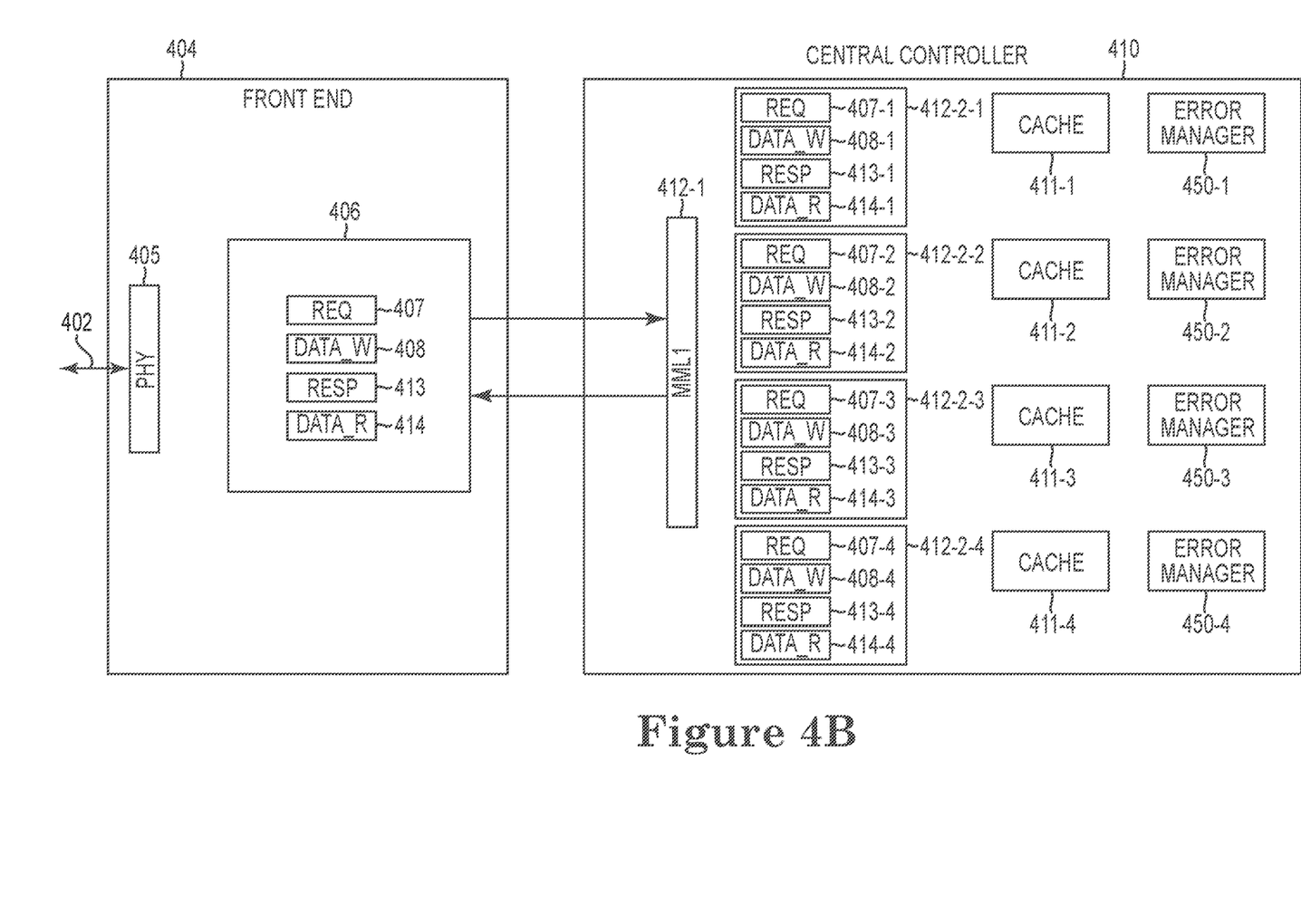
FIG. 4B is a block diagram of a portion of a memory controller having a memory access request/response buffer architecture in accordance with a number of embodiments of the present disclosure.

FIG. 3 is a block diagram of a memory controller 300 having a cache architecture operable in accordance with a number of embodiments of the present disclosure. The memory controller 300 is analogous to the memory controller 200 shown in FIG. 2 with the exception that the cache 211 in FIG. 2 is replaced with multiple separate and independently operated caches 311-1, 311-2, . . . , 311-X corresponding to respective channel groups (e.g., RAS channels) 340-1, 340-2, . . . , 340-X. In embodiments in which the channel groups include separate and independently operated caches, the channel groups may be referred to as "cached RAS channels."

Accordingly, as shown in FIG. 3, the controller 300 includes a front end portion 304, a central portion 310, and a back end portion 319. The front end portion 304 includes a front end PHY 305 for interfacing with a host via communication link 302, which can be a CXL link, for example. The front end 304 includes a front end controller 306 to manage the interface and communicate with the central controller 310. In embodiments in which the link 302 is a CXL link, the front end controller 306 is configured to receive (e.g., from a host) memory access requests, according to a CXL protocol, directed at the memory devices 330, and to provide (e.g., to a host) memory access responses, according to a CXL protocol, corresponding to memory access requests. The front end controller 306 can include memory access request/response buffers 307, 308, 313, and 314, which can be analogous to the respective buffers 107, 108, 113, and 114 described in FIG. 1.

The controller 200 is coupled to the memory devices 330 via a number of memory channels 325. In this example, the memory channels 325 are organized as a number of channel groups 340-1, 340-2, . . . , 340-X. In this example, each channel group 340 comprises "M" memory channels 325. For instance, channel group 340-1 comprises memory channels 325-1-1, 325-1-2, . . . , 325-1-M, channel group 240-2 comprises memory channels 325-2-1, 325-2-2, . . . , 325-2-M, and channel group 340-X comprises memory channels 325-X-1, 325-X-2, . . . , 325-X-M.

The back end portion 319 of controller 300 includes a plurality of memory channel controllers (MCC) 328 for interfacing with memory devices 330 corresponding to the respective memory channels 325. As shown in FIG. 3, the memory channel controllers 328-1-1, 328-1-2, . . . , 328-1-M corresponding to channel group 340-1 are coupled to the memory devices 330 via respective channels 325-1-1, 325-2-2, . . . , 325-1-M. Although not shown in FIG. 3, the back end 319 includes a PHY memory interface for coupling to the memory devices 330.

The respective channels 325 of the channel groups 340-1, 340-2, . . . , 340-X are operated together for purposes of one or more RAS schemes. Accordingly, the channel groups 340 may be referred to as "RAS channels." In this example, the channel groups 340-1, 340-2, . . . , 340-X include respective error circuitry (RAS CHANNEL CIRCUITRY) 342-1, 342-2, . . . , 342-X. The error circuitry 342 can include various circuitry for error detection and/or error correction, which can include data recovery. The error circuitry 342 can also include CRC circuitry, ECC, circuitry, RAID circuitry and/or chip kill circuitry, including various combinations thereof. The channel groups 340-1, 340-2, ..., 340-X can be operated independently by the central controller 310 such that memory access requests and/or error operations can be separately (and concurrently) performed on the memory devices 330 corresponding to the respective channel groups 340.

As shown in FIG. 3, each of the channel groups 340 can include memory channel datapath circuitry (MEM CH) 326 associated with the corresponding memory channels 325 of a particular channel group 340. For example, channel group 340-1 includes memory channel datapath circuitry 326-1-1, 326-1-2, ..., 326-1-M corresponding to respective channels 325-1-1, 325-1-2, ..., 325-1-M. Similarly, channel group 340-2 includes memory channel datapath circuitry 326-2-1, 326-2-2, ..., 326-2-M corresponding to respective channels 325-2-1, 325-2-2, ..., 325-2-M, and channel group 340-X includes memory channel datapath circuitry 326-X-1, 326-X-2, 326-X-M corresponding to respective channels 325-X-1, 325-X-2, ..., 325-X-M. The datapath circuitry 326 can include error circuitry corresponding to error detection or error correction on a particular memory channel 325. For instance, the datapath circuitry 326 might include CRC circuitry or ECC circuitry. That is, in contrast to the error circuitry 342, which can be associated with multiple channels 325 within the channel group 340, the error circuitry of datapath circuitry 326 can be associated with or dedicated to a particular memory channel 325.

As shown in FIG. 3, the central controller 310 can include a media management layer (MML) 312 that can be used to translate memory access requests in accordance with a particular protocol (e.g., CXL compliant requests) into a protocol compliant with the particular central controller architecture and/or particular type of memory media (e.g., memory devices 330).

The central controller 310 includes a plurality of caches 311-1, 311-2, ..., 311-X corresponding to the respective channel groups 340-1, 340-2, ..., 340-X. The caches 311 include associated cache controllers for independently operating the respective caches. The caches 311-1, 311-2, ..., 311-X can be, for example, set-associative caches. In various embodiments, the physical address regions associated with (e.g., assigned to) the caches 311 do not overlap, which can ensure that all of the "X" caches 311 can concurrently access the memory devices 330.

A number of embodiments can include receiving a memory access request (e.g., a read or write request) at the memory controller 300 from a host (e.g., host 103 shown in FIG. 1). The controller 300 can execute the memory access request by determining to which one of the caches 311 an address corresponding to the access requests corresponds. The controller can then execute the access request using the corresponding cache (e.g., 311-1), RAS channel circuitry (e.g., 342-1), memory channel datapath circuitry (e.g., 326-1-1, 326-1-2, ..., 326-1-M) and back end memory channel controllers (e.g., 328-1-2, 328-1-2, ..., 328-1-M) to access the corresponding memory devices 330 via the corresponding memory channels (e.g., 325-1-1, 325-1-2, ..., 325-1-M).

FIG. 4A is a block diagram of a portion of a memory controller having a memory access request/response buffer architecture in accordance with a number of embodiments of the present disclosure. FIG. 4A illustrates a front end portion 404 and a central controller portion 410 of a memory controller such as memory controller 300 shown in FIG. 3. The backend portion (e.g., 319) is omitted for clarity.

The front end 404 includes a PHY 405 for interfacing with a host via link 402, and a front end controller 406. In contrast to the examples shown in FIGS. 1, 2, and 3, the front end 404 of the embodiment shown in FIG. 4A does not include memory access request/response buffers. Rather, the memory access request/response buffers are implemented as multiple sets of memory access request/response buffers in the central controller 410.

In this example, the central controller 410 includes a first set of memory access request/response buffers 407-1, 408-1, 413-1, and 414-1, a second set of a first set of memory access request/response buffers 407-2, 408-2, 413-2, and 414-2, a third set of memory access request/response buffers 407-3, 408-3, 413-3, and 414-3, and a fourth set of memory access request/response buffers 407-4, 408-4, 413-4, and 414-4. The sets of memory access request/response buffers can correspond to respective channel groups (e.g., RAS channels) 340-1, 340-2, ..., 340-X described in FIG. 3. As described in FIG. 3, each channel group in FIG. 4A comprises a respective corresponding independent cache 411-1, 411-2, 411-3, and 411-4 (corresponding to 4 cached RAS channels). Each channel group can also include a corresponding error manager 450-1, 450-2, 450-3, and 450-4 for performing error detection/correction operations associated with reading data from and writing data to memory devices corresponding to the respective channel groups. The error managers 450 can include various error circuitry such as CRC circuitry, ECC circuitry, RAID recovery circuitry, and chip kill circuitry, such as described above, among other circuitry associated with providing data protection, reliability, integrity, authenticity, etc.

In the example shown in FIG. 4A, the central controller 410 includes a media management layer (MML1) 412-1 that can include circuitry configured to translate requests from a host protocol that may not be compliant with the central controller 410 to a different protocol that is compliant with the central controller 410. The central controller 410 comprises an additional media management layer 412-2-1, 412-2-2, 412-2-3, and 412-2-4 corresponding to the respective channel groups. As shown in FIG. 4A, the media management layers 412-2-1, 412-2-2, 412-2-3, and 412-2-4 can include the respective sets of memory access request/response buffers 407, 408, 413, and 414 and can include circuitry configured to provide additional functionality associated with translating requests between the buffer sets and the corresponding caches 411-1, 411-2, 411-3, and 411-4, for example.

Although the central controller 410 illustrates cached channel groups (e.g., cached RAS channels), embodiments are not so limited. For example, the central controller may not include the caches 411-1, 411-2, 411-3, and 411-4 (e.g., the central controller 410 can be cacheless).

The embodiment described in FIG. 4A can provide various benefits as compared to prior memory controller architectures. For instance, removing request/response buffers from the front end 404 can reduce or eliminate queue congestion associated with the front end 404 that previously lead to the front end 404 being a bottleneck of the controller and/or memory system latency. Also, providing multiple sets of request/response buffers as opposed to a single set of buffers can reduce latency by providing increased parallelism as the multiple sets of buffers can be operated concurrently in association with executing memory access requests.

FIG. 4B is a block diagram of a portion of a memory controller having a memory access request/response buffer architecture in accordance with a number of embodiments of the present disclosure. The embodiment described in FIG. 4B is the same as the embodiment 4A except that the front end controller 406 includes memory access request response buffers 407 (REQ), 408 (DATA_W), 413 (RESP), and 414 (DATA_R) in addition to the multiple sets of buffers of the central controller 410.

In a number of embodiments, the front end buffers 407, 408, 413, and 414 can have a reduced depth as compared to the central controller buffers and memory access requests can be passed through to the front end buffers to the central controller buffers to avoid front end congestion. As an example, the front end buffers might have a queue depth of 1. The embodiment shown in FIG. 4B can be beneficial, for example, in instances in which the front end 404 is manufactured separately from the central controller 410. In such instances, the front end buffers may be included with the front end, but it may be beneficial to operate the front end buffers in a manner that facilitates use of the multiple buffer sets provided in the central controller 410 in order to provide improved system latency, for instance.

Figure 5:
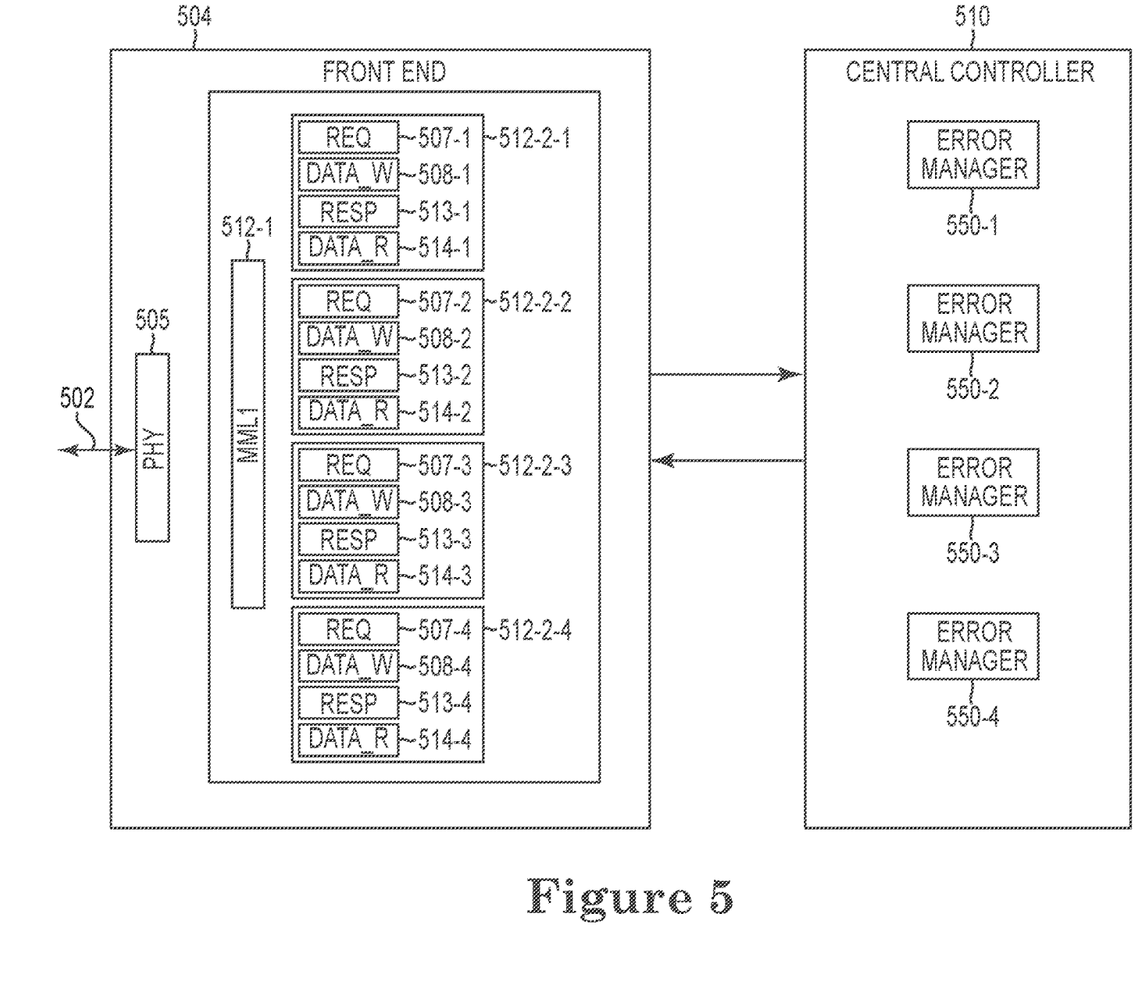
FIG. 5 is a block diagram of a portion of a memory controller having a memory access request/response buffer architecture in accordance with a number of embodiments of the present disclosure.

FIG. 5 is a block diagram of a portion of a memory controller having a memory access request/response buffer architecture in accordance with a number of embodiments of the present disclosure. FIG. 5 illustrates a front end portion 504 and a central controller portion 510 of a memory controller such as memory controller 300 shown in FIG. 3. The backend portion (e.g., 319) is omitted for clarity.

The front end 504 includes a PHY 505 for interfacing with a host via link 502, and a front end controller 506. In contrast to the examples described in FIGS. 1, 2, 3, 4A, and 4B, the front end 504 of the embodiment shown in FIG. 5 includes multiple sets of memory access request/response buffers.

In this example, the front end 504 includes a first set of memory access request/response buffers 507-1, 508-1, 513-1, and 514-1, a second set of a first set of memory access request/response buffers 507-2, 508-2, 513-2, and 514-2, a third set of memory access request/response buffers 507-3, 508-3, 513-3, and 514-3, and a fourth set of memory access request/response buffers 507-4, 508-4, 513-4, and 514-4. The sets of memory access request/response buffers can correspond to respective channel groups (e.g., RAS channels) 340-1, 340-2, . . . , 340-X described in FIG. 3.

In FIG. 5, the channel groups comprise respective corresponding error managers 550-1, 550-2, 550-3, and 550-4 for performing error detection/correction operations associated with reading data from and writing data to memory devices corresponding to the respective channel groups. The error managers 450 can include various error circuitry such as CRC circuitry, ECC circuitry, RAID recovery circuitry, and chip kill circuitry, such as described above, among other circuitry associated with providing data protection, reliability, integrity, authenticity, etc. Although the channel groups shown in the example of FIG. 5 do not include respective corresponding caches (e.g., per RAS channel), embodiments are not so limited. For example, the central controller 510 may include a separate and independently operated cache per channel group such as shown in FIGS. 4A and 4B.

In the example shown in FIG. 5, the front end 504 includes a media management layer (MML1) 512-1 that can include circuitry configured to translate requests from a host protocol (e.g., a CXL protocol) that may not be compliant with operating the multiple sets of memory access request/response buffers to a different protocol that is so compliant. In this example, the front end 504 comprises an additional media management layer 512-2-1, 512-2-2, 512-2-3, and 512-2-4 corresponding to the respective channel groups. As shown in FIG. 5, the media management layers 512-2-1, 512-2-2, 512-2-3, and 512-2-4 can include the respective sets of memory access request/response buffers 507, 508, 513, and 514 and can include circuitry configured to provide additional functionality associated with translating requests between the buffer sets and central controller 510, for example.

The embodiment described in FIG. 5 can provide various benefits as compared to prior memory controller architectures. For instance, providing multiple request/response buffers in the front end 504 can reduce or eliminate queue congestion associated with a single set of memory access request/response buffers that previously lead to the front end 504 being a bottleneck of the controller and/or memory system latency.

Various methods described herein can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Unless otherwise specified, the order of the processes can be modified. Thus, the illustrated embodiments should be understood only as examples, and the described processes can be performed in a different order, and some processes can be performed in parallel. Additionally, one or more processes can be omitted in various embodiments. Thus, not all processes are required in every embodiment. Other process flows are possible.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:
1. An apparatus, comprising:
a plurality of memory devices; and
a memory controller coupled to the plurality of memory devices via a plurality of memory channels;
wherein the plurality of memory channels are organized as a plurality of channel groups;

wherein the memory controller comprises a plurality of memory access request/response buffer sets, and wherein each memory access request/response buffer set of the plurality of memory access request/response buffer sets corresponds to a different one of the plurality of channel groups; and wherein the memory controller is configured to:
operate the plurality of channel groups as independent respective reliability, availability, and serviceability (RAS) channels; and
implement one of a chip kill error correction scheme and a RAID error recovery scheme on a per RAS channel basis.

2. An apparatus, comprising:
a plurality of memory devices; and
a memory controller coupled to the plurality of memory devices via a plurality of memory channels;
wherein the plurality of memory channels are organized as a plurality of channel groups;
wherein the memory controller comprises a plurality of memory access request/response buffer sets, and wherein each memory access request/response buffer set of the plurality of memory access request/response buffer sets corresponds to a different one of the plurality of channel groups;
wherein the memory controller comprises a front end portion that includes a compute express link (CXL) controller coupled to a host via a CXL link; and
wherein the front end portion does not include master to subordinate (M2S) and subordinate to master (S2M) buffers, and wherein the plurality of memory access request/response buffer sets are located in a central controller portion of the memory controller.

3. The apparatus of claim 2, wherein the memory controller is configured to concurrently operate the plurality of memory access request/response buffer sets in association with performing memory access requests on memory devices corresponding to respective channel groups.

4. The apparatus of claim 2, wherein each memory access request/response buffer set of the plurality of memory access request/response buffer sets comprises:
a read request buffer;
a write request buffer;
a read response buffer; and
a write response buffer.

5. The apparatus of claim 4, wherein:
the read request buffer is a master to subordinate (M2S) request buffer in accordance with a compute express link (CXL) protocol;
the write request buffer is a M2S request buffer in accordance with the CXL protocol;
the read response buffer is a subordinate to master (S2M) response buffer in accordance with the CXL protocol; and
the write request buffer is a S2M response buffer in accordance with the CXL protocol.

6. The apparatus of claim 2, wherein the plurality of channel groups comprises:
a first channel group comprising a first quantity of the plurality of memory channels; and
a second channel group comprising a second quantity of the plurality of memory channels;
wherein the first channel group includes first error correction circuitry that is operated, by the memory controller, in association with accessing memory devices corresponding to the first quantity of the plurality of memory channels; and wherein the second channel group includes second error correction circuitry that is operated, by the memory controller and independently from the first error correction circuitry, in association with accessing memory devices corresponding to the second quantity of the plurality of memory channels.

7. The apparatus of claim 6, wherein the plurality of channel groups comprises:
a third channel group comprising a third quantity of the plurality of memory channels; and
wherein the third channel group includes third error correction circuitry that is operated, by the memory controller and independently from the first error correction circuitry and the second error correction circuitry, in association with accessing memory devices corresponding to the third quantity of the plurality of memory channels.

8. The apparatus of claim 2, wherein the memory controller comprises a plurality of independent caches, with each cache of the plurality of independent caches corresponding to a different one of the plurality of channel groups, and wherein each respective channel group comprises at least two memory channels of the plurality of memory channels.

9. The apparatus of claim 8, wherein the plurality of independent caches correspond to respective different non-overlapping physical address ranges corresponding to the plurality of memory devices.

10. The apparatus of claim 2, wherein the memory controller is configured to:
operate the plurality of channel groups as independent respective reliability, availability, and serviceability (RAS) channels; and
implement one of a chip kill error correction scheme and a RAID error recovery scheme on a per RAS channel basis.

11. A memory controller, comprising:
a front end portion configured to be coupled to a host via an interface;
a back end portion configured to be coupled to a plurality of memory devices via a plurality of memory channels, wherein the plurality of memory channels are organized as a plurality of channel groups; and
a central portion comprising a plurality of memory access request/response buffer sets, wherein each memory access request/response buffer set of the plurality of memory access request/response buffer sets corresponds to a different one of the plurality of channel groups; and
wherein the front end portion includes a single different memory access request/response buffer set having a queue depth that is less than a queue depth corresponding to the plurality of memory access request/response buffer sets.

12. The memory controller of claim 11, wherein the central portion further comprises a plurality of independent caches, wherein each cache of the plurality of independent caches corresponds to a different one of the plurality of channel groups.

13. The memory controller of claim 11, wherein the plurality of memory access request/response buffer sets are configured to be operated in parallel in association with performing memory access requests in parallel on memory devices corresponding to the respective channel groups.

14. The memory controller of claim 11, wherein the interface operates in accordance with a compute express link (CXL) protocol.

15. The memory controller of claim 11, wherein the central portion includes, for each respective channel group:
first error circuitry configured to implement error detection/correction across the plurality of memory channels corresponding to the respective channel group; and
second error circuitry configured to implement error detection/correction on a per memory channel basis.

16. An apparatus, comprising:
a plurality of memory devices; and
a memory controller coupled to the plurality of memory devices via a plurality of memory channels, wherein the plurality of memory channels are organized as a plurality of channel groups;
wherein the memory controller comprises:
a front end portion configured to:
receive memory access requests from a host in accordance with a compute express link (CXL) protocol; and
provide memory access responses to the host in accordance with the CXL protocol; and
a central portion comprising a plurality of memory access request/response buffer sets, wherein each memory access request/response buffer set of the plurality of memory access request/response buffer sets corresponds to a different one of the plurality of channel groups; and
wherein the central portion further comprises a plurality of independent caches corresponding to the respective plurality of channel groups; and
the memory controller is configured to operate the plurality of channel groups as independent respective reliability, availability, and serviceability (RAS) channels.

* * * * *